United States Patent [19]

Kozaki et al.

[11] Patent Number: 5,054,910

[45] Date of Patent: Oct. 8, 1991

[54] PROJECTION APPARATUS

[75] Inventors: Shyuichi Kozaki, Nara; Fumiaki Funada, Yamatokoriyama, both of Japan

[73] Assignee: Sharp Kabushiki Kaisha, Osaka, Japan

[21] Appl. No.: 415,711

[22] Filed: Oct. 2, 1989

[30] Foreign Application Priority Data

Oct. 4, 1988 [JP] Japan ................ 63-251196

[51] Int. Cl.$^5$ ................ G03B 21/00; G02F 1/13
[52] U.S. Cl. ................ 353/31; 353/34; 359/41; 359/53; 359/54
[58] Field of Search ............ 353/31, 34, 122; 350/333, 332, 331 R, 345, 338

[56] References Cited

U.S. PATENT DOCUMENTS

| | | | |
|---|---|---|---|
| 4,171,874 | 10/1979 | Bigelow et al. | 350/345 |
| 4,378,955 | 4/1983 | Bleha, Jr. et al. | 350/334 |
| 4,601,543 | 7/1986 | Boyd et al. | 350/331 R |
| 4,697,884 | 10/1987 | Amstutz et al. | 350/334 |
| 4,850,685 | 7/1989 | Kamakura et al. | 353/31 |
| 4,856,875 | 8/1989 | Kozaki et al. | 350/333 |
| 4,915,479 | 4/1990 | Clarke | 350/345 |

FOREIGN PATENT DOCUMENTS 8905470  6/1989  European Pat. Off. ............ 353/34

*Primary Examiner*—William A. Cuchlinski, Jr.
*Assistant Examiner*—William C. Dowling

[57] ABSTRACT

A projection apparatus includes three liquid crystal panels for independently controlling respective color light components of red, green and blue for a color image to be reproduced. The apparatus further includes devices for subjecting the respective color light components to additive mixture so as to reproduce the color image. Each of the liquid crystal panels is constituted by a nematic type simple matrix liquid crystal panel having twist angle $\phi$ of its liquid crystal molecule represented by $$210° \leq \phi \leq 300°.$$

12 Claims, 4 Drawing Sheets

PROJECTION APPARATUS

BACKGROUND OF THE INVENTION

The present invention generally relates to a projection arrangement more particularly, it relates to a projection apparatus arranged to independently control respective color light components of additive process three primary colors (red, green and blue) for a color image to be reproduced, by three liquid crystal panels. It is further arranged to reproduce said color image by subjecting the respective color light components to additive mixture.

In the conventional projection apparatus, it has been so arranged that, exclusive cathode ray tubes are employed for the respective three primary colors. Further, images produced by such cathode ray tubes are adapted to be projected onto a screen.

Recently, in the field of such projection apparatuses, an arrangement has been developed in which the cathode ray tubes are replaced by liquid crystal panels. The liquid crystal panel referred to above is generally so constructed so as to include, as constituting elements, a large number of picture element electrodes at least arranged in a dot matrix pattern, and a liquid crystal layer for modulating light according to voltages applied thereto thus the system thereby displays arbitrary single color images, including a half tone, by applying image signals corresponding to respective picture elements.

Many operating modes are available for liquid crystal panels such as twisted-nematic (TN), guest-host (GH), dynamic scattering mode (DSM), double refraction (DAP or ECB, etc.), phase transition, and the like.

In order to separately control individual picture elements of the liquid crystal panel, any one of the following three systems is normally employed.

(1) Simple matrix system

In this system, line electrodes and row electrodes are provided in a stripe pattern on respective two substrates. They are applied to each other such that the line and row electrodes cross each other to constitute the panel. Line selecting signals are successively applied to the line electrodes, while image signals are applied to the row electrodes in synchronization with the line selecting signals. The intersecting points between the line electrodes and row electrodes constitute the picture elements. Further, the liquid crystal held between both electrodes varies in its optical characteristic in response to the potential difference thereof. It is to be noted, however, that, since the liquid crystal is an element responding to effective values, generation of cross-talk is brought into question in the general driving in which voltage averaging method is applied to the TN mode or GH mode. Thus, the number of scanning lines can not be set very large.

(2) Addition of non-linear element

This is a system in which a non-linear element such as a varistor, NIM (Metal/Insulator/Metal) or the like is added to each picture element for suppressing the cross-talk.

(3) Addition of switching element

In this system, a switching transistor is added to each picture element for individual driving. Driving voltage is applied during the selecting period so as to be charged into an accumulating capacitor for being maintained also during the non-selecting period. It should be noted here that, since the liquid crystal itself is a capacitive load, in the case where time constant thereof is sufficiently large as compared with the repeating period of driving, the accumulating capacitor may be abbreviated.

For the switching transistor, a thin film transistor (TFT) or MOS-FET and the like formed on a silicone wafer may be employed.

In the projection apparatus already developed and commercialized, the arrangement of the item (3) provided with the switching element is employed in the above three systems for the liquid crystal panel.

However, the liquid crystal panel of the system in the above item (3) has such a problem that mass-production thereof is difficult. Thus a consequent increase in cost occurs, similar to the liquid crystal of the item (2).

Meanwhile, although the liquid crystal panel of the simple matrix system in the item (1) can be readily manufactured on a large scale for cost reduction, generation of the cross-talk is brought into question in the general driving by the TN mode, GH mode as referred to earlier. It further contains a drawback that the display contrast is undesirably lowered as the number of scanning lines is increased.

SUMMARY OF THE INVENTION

Accordingly, an essential object of the present invention is to provide a projection apparatus employing a liquid crystal panel which can be readily manufactured on a large scale for reduction in cost, and is capable of providing a favorable contrast in the display.

Another object of the present invention is to provide a projection apparatus of the above described type which is stable in functioning at high reliability.

In accomplishing these and other objects, according to one preferred embodiment of the present invention, there is provided a projection apparatus which includes three liquid crystal panels for independently controlling respective color light components of red, green and blue for a color image to be reproduced further, it includes means for subjecting the respective color light components to additive mixture so as to reproduce the color image. Each of the liquid crystal panels is constituted by a nematic type simple matrix liquid crystal panel having twist angle $\phi$ of its liquid crystal molecule represented by $$210° \leq \phi \leq 300°.$$

By the arrangement according to the present invention, as referred to above, since the simple matrix liquid crystal panel of the super-twisted nematic type is employed for each of the three liquid crystal panels, the display contrast may be advantageously improved.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 1:
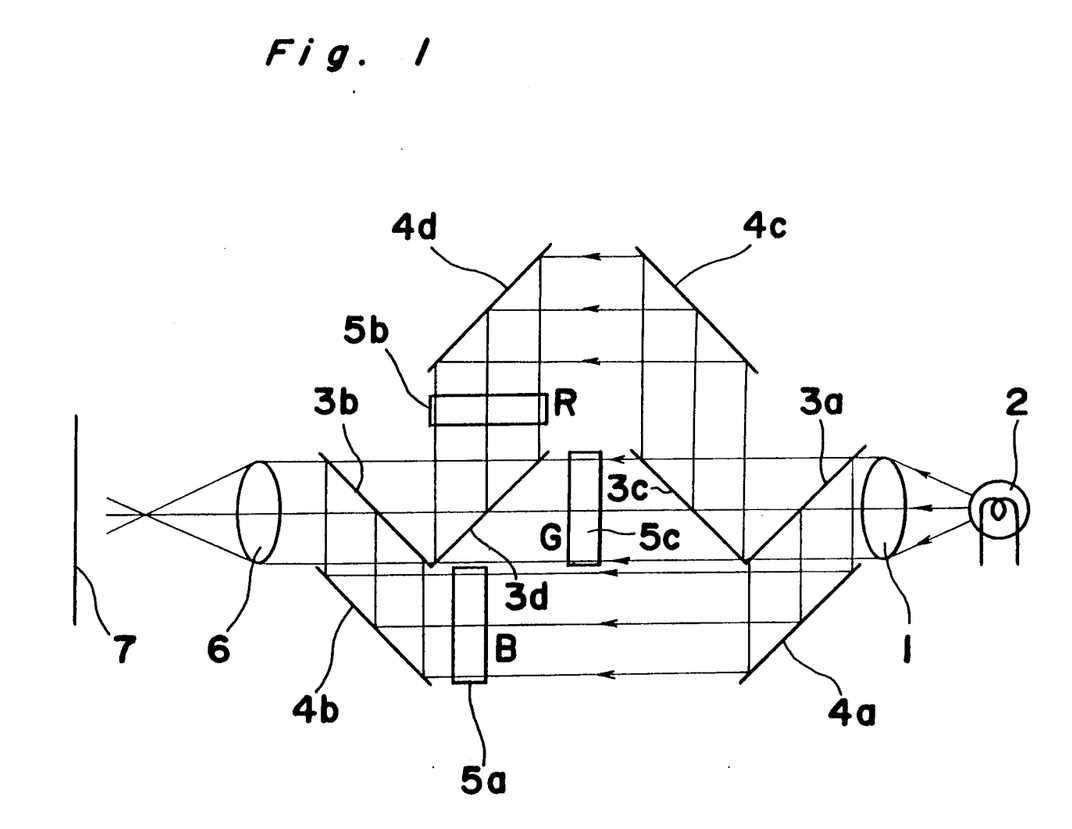
FIG. 1 is a diagram schematically showing construction of an optical system for a projection apparatus according to one preferred embodiment of the present invention.

Referring now to the drawings, there is shown in FIG. 1, a schematic diagram showing construction of an optical system for a projection apparatus according to one preferred embodiment of the present invention.

In FIG. 1, light emitted from a light source 2 is converged by a condenser lens 1 into parallel rays, which are directed to a dichroic mirror 3a.

For the light source 2, an incandescent lamp, halogen lamp, xenon lamp or the like may be employed, and the spectrum of the light source 2 need not necessarily be of continuous spectrum. It may be of bright line spectrum for red, green and blue emitted by a fluorescent lamp or discharge tube. In this case, it is preferable that center wavelengths of the bright line spectrum are in the vicinity of 620 nm for the red light, 550 nm for the green light, and 450 nm for the blue light from the viewpoints of a color reproducing range of the projection apparatus, and also of interchangeability with television signals of NTSC system.

The dichroic mirror 3a, formed by laminating a plurality of thin films having different refraction indexes, has a function to reflect only light rays of particular wavelength region by an interference effect and to allow other light rays to pass therethrough. In the example of FIG. 1, the dichroic mirror 3a is adapted to selectively reflect the blue light in the light rays from the light source 2 projected through the condenser lens 1, and to permit other light rays to pass therethrough.

The blue light reflected by the dichroic mirror 3a is again reflected by a mirror 4a, and in the course of a light path of the reflected light, a first simple matrix liquid crystal panel 5a is provided. The blue light transmitted through the liquid crystal panel 5a is reflected by a mirror 4b. It is further reflected by another dichroic mirror 3b, which has the function to selectively reflect the blue light in the similar manner as in the dichroic mirror 3a described earlier. The light reflected by the dichroic mirror 3b is converged by a projection lens 6 so as to be projected onto a screen 7.

Meanwhile, in the course of a light path of the light transmitted through the dichroic mirror 3a, there is provided another dichroic mirror 3c which has the function to selectively reflect the red light and to allow other light rays to pass therethrough. Also the red light reflected by the dichroic mirror 3c is further reflected by mirrors 4c and 4d. In the course of a light path of the red light reflected by the mirror 4d, a second simple matrix liquid crystal panel 5b is provided. The red light transmitted through this simple matrix liquid crystal panel 5b is reflected by another dichroic mirror 3d having the function to selectively reflect the red light in the similar manner as in the dichroic mirror 3c referred to earlier, and to permit other light rays to pass therethrough. The red light reflected by the dichroic mirror 3d, is transmitted through the dichroic mirror 3b and converged by a projection lens 6 so as to be projected onto the screen 7.

Moreover, in the course of a light path of the green light transmitted through the dichroic mirror 3c, a third simple matrix liquid crystal panel 5c is provided. The green light transmitted through the liquid crystal panel 5c further passes through dichroic mirrors 3d and 3b so as to be converged by the projection lens 6 and projected onto the screen 7.

Figure 2:
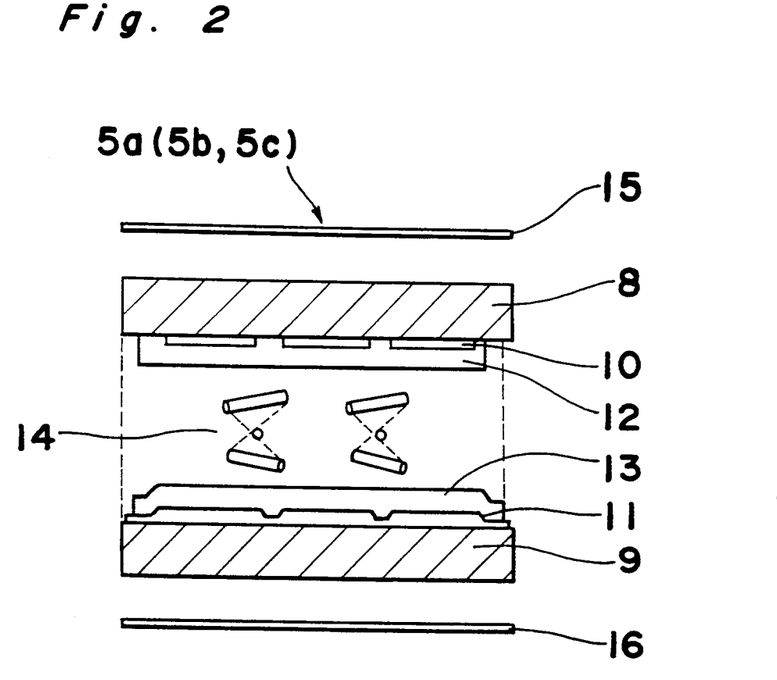
FIG. 2 is a longitudinal cross section of a simple matrix liquid crystal panel employed in the arrangement of FIG. 1.

Referring also to FIG. 2 schematically showing the construction of each of the simple matrix liquid crystal panels 5a, 5b and 5c, on the confronting surfaces of one glass substrate 8 and the other glass substrate 9, transparent electrodes 10 and 11 are respectively formed in patterns. These transparent electrodes 10 and 11 are arranged so as to cross each other. Over the surfaces of the respective transparent electrodes 10 and 11, aligning films 12 and 13 composed of coatings by polyimide group high polymer are respectively formed. Further, surfaces of the films 12 and 13 are subjected to rubbing treatment by cloth in one direction.

Between these glass substrates 8 and 9, a liquid crystal layer 14 is disposed so as to be sealed therein by a sealing member (not shown). Moreover, over the surfaces of the glass substrates 8 and 9 directed opposite to each other, polarizing plates 15 and 16 are respectively provided. In each of these simple matrix liquid crystal panels 5a, 5b and 5c, picture elements are formed at respective portions of the liquid crystal layer 14 where the transparent electrodes 10 and 11 cross each other.

Figure 3:
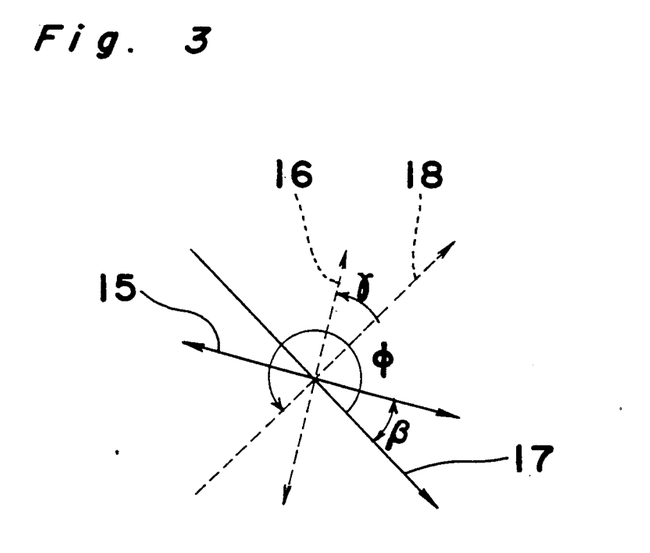
FIG. 3 is a diagram showing relation between rubbing angle and twist angle of the liquid crystal molecule in the simple matrix liquid crystal panel of FIG. 1.

Reference is also made to FIG. 3 showing the relation between the rubbing angle and twist angle of the liquid crystal molecule in the simple matrix liquid crystal panel 5a, 5b or 5c.

In FIG. 3, the twist angle of the liquid crystal molecule may be represented by an angle $\phi$ formed by the rubbing direction 17 of the one glass substrate 8 (i.e. the long-axis or parallel direction of the liquid crystal molecule on the glass substrate 8) and the rubbing direction 18 of the other glass substrate 9. The direction of a polarizing axis of the polarizing plate 15 is deviated by an angle $\beta$ with respect to the rubbing direction 17 of the one glass substrate 8. Further direction of the polarizing plate 16 with respect to the rubbing direction 18 of the other glass substrate 9 is deviated by an angle $\gamma$.

In the above embodiment, the twist angle $\phi$ of the liquid crystal molecule is set to be 270°. In other words, each of the simple matrix liquid crystal panels 5a, 5b and 5c in this case is of a super twisted nematic type (referred to as STN hereinafter). Further, an optical substance S-811 (name used in trade and manufactured by Merck Co.,) is added to the liquid crystal by 1.27 weight % so that the twist angle $\phi$ thereof becomes 270°. Meanwhile, the layer thickness d of the liquid crystal layer 14 in this case is set at 6.7 $\mu$m. Also, coatings of polyimide group high polymer are employed as the aligning films 12 and 13.

Table 1 below shows compositions of the PCH group liquid crystal employed for the present embodiment.

TABLE 1

| Compositions | Composition ratio (wt %) |
| --- | --- |
| $C_3H_7$—(H)—(O)—CN | 8.0 |
| $C_5H_{11}$—(H)—(O)—CN | 8.0 |
| $C_3H_7$—(H)—(O)—$OC_2H_5$ | 6.0 |
| $C_3H_7$—(H)—(O)—$OC_4H_9$ | 5.0 |
| $C_3H_7$—(H)—(O)—$C_2H_5$ | 24.0 |
| $C_5H_{11}$—(H)—(O)—(O)—CN | 5.0 |
| $C_5H_{11}$—(H)—(O)—(O)—$C_2H_5$ | 8.0 |
| $C_3H_7$—(H)—(O)—(O)—$C_3H_7$ | 7.0 |
| $C_3H_7$—(H)—(O)—COO—(O)—$C_3H_7$ | 10.0 |
| $C_5H_{11}$—(H)—(O)—COO—(O)—$C_3H_7$ | 7.0 |
| $C_3H_7$—(H)—(H)—(O)—$CH_3$ | 6.0 |
| $C_3H_7$—(H)—(H)—(O)—$C_2H_5$ | 6.0 |

Now, when a spiral pitch of the liquid crystal molecule in this case is represented by p, d/p becomes approximately 0.65. Since refractive index anisotropy $\Delta n$ of the nematic liquid crystal shown in Table 1 becomes 0.12 with respect to light having a wavelength $\lambda$ of 550 nm, in the present embodiment in which the thickness d of the liquid crystal layer 14 is set to be $$d = 6.7 \mu m,$$

the relation will be represented as $$\Delta n \cdot d = 0.80 \mu m.$$

It is to be noted here that the setting angles $\beta$ and $\gamma$ of the polarizing axes for the one polarizing plate 15 and the other polarizing plate 16 are respectively set as $$\beta = 45° \text{ and } \gamma = 45°$$

Figure 4:
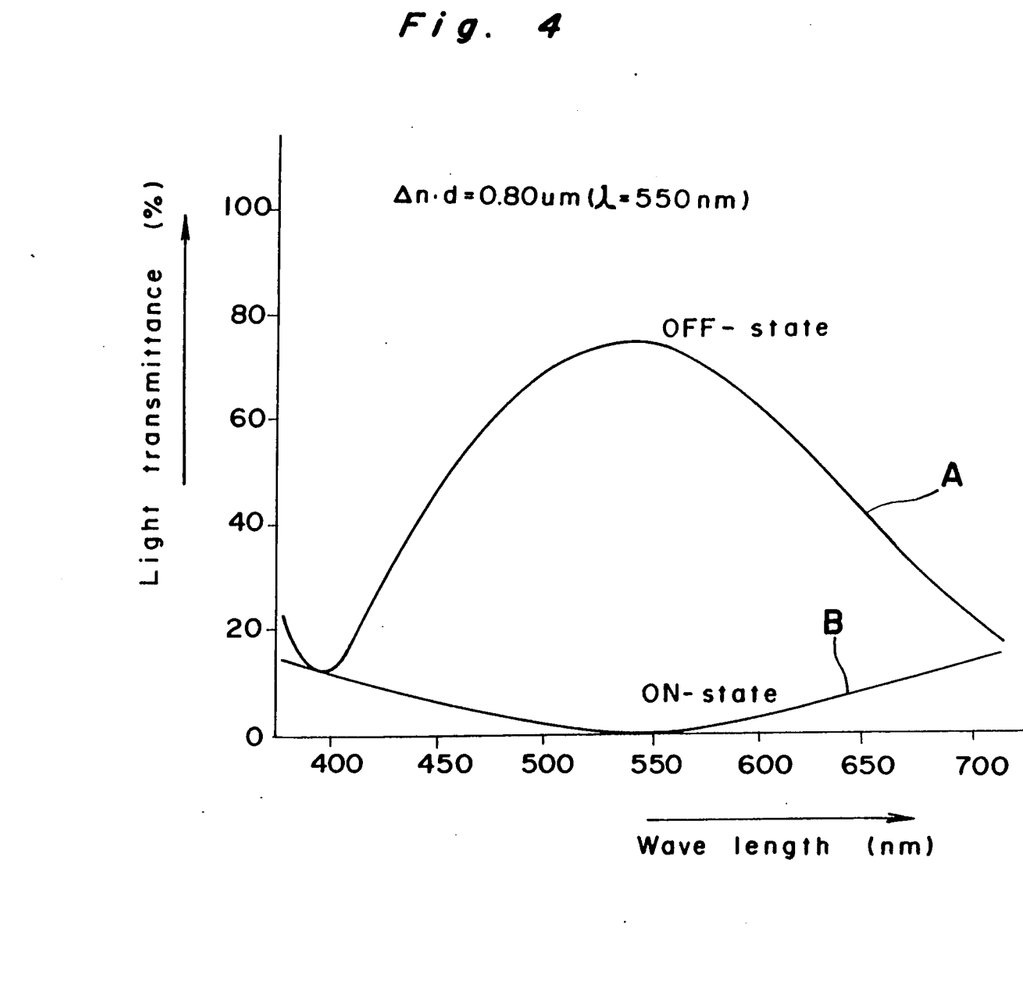
FIG. 4 is a graph showing light transmittance characteristics of the simple matrix liquid crystal panel for controlling green light, and FIGS. 5(1) to 5(3) are graphs showing light transmittance characteristics of the respective simple matrix liquid crystal panels under optimum conditions.
Figure 5:
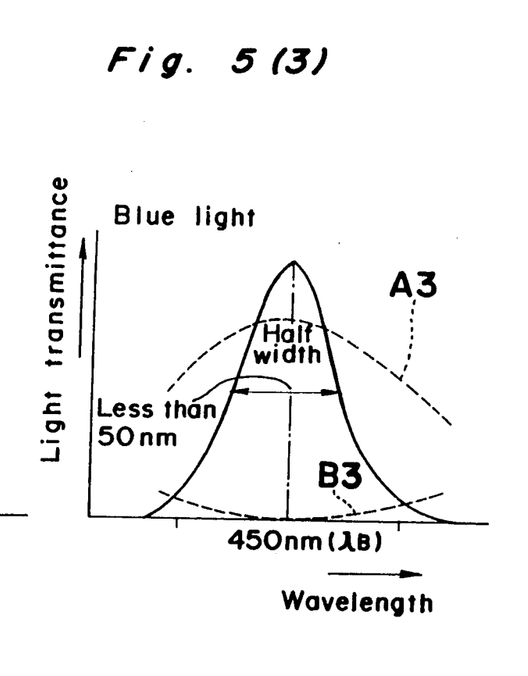

By applying the above setting conditions, for example, to the simple matrix liquid crystal panel 5c which allows the green light to pass therethrough, the light transmittance characteristics of the liquid crystal panel 5c will be as shown in FIG. 4.

In FIG. 4, a curve A represents the transmittance characteristic when a non-selected voltage waveform is applied across the two transparent electrodes 10 and 11. Curve B shows the transmittance characteristic in the case where a selected voltage is applied across the transparent electrodes 10 and 11. As is seen from FIG. 4, this simple matrix liquid crystal panel 5c is to have a sufficient photo-switch function particularly for the green light.

It is to be noted here that, with respect to the value of $\Delta n \cdot d$, if the lower limit thereof becomes excessively small, light can no longer be propagated along the twisting direction of the liquid crystal molecule further, a consequent deterioration in the function as a photo-shutter element occurs. However, when the value of $\Delta n \cdot d$ becomes too large, unnecessary spectrum tends to appear in the visible light passing through the simple matrix liquid crystal panels 5a, 5b and 5c. Accordingly, for obtaining a favorable color display characteristic, the range of $\Delta n \cdot d$ for practical application should preferably be set as represented by $$0.3 \mu m \leq \Delta n \cdot d \leq 1.6 \mu m \tag{1}$$

Similar results may be obtained thereby even when liquid crystals other than the PCH group liquid crystal are employed.

On the other hand, from the viewpoint of improving the display contrast of the color image to be reproduced by the projection apparatus of the present invention as described so far, setting angles $\beta$ and $\gamma$ of the polarizing axes for the two polarizing plates 15 and 16 should preferably be determined in the ranges as follows for practical applications.

$$\beta = 50° \pm 20$$

and $$\gamma = 45° \pm 20° \tag{2}$$

Meanwhile, in order to improve the display contrast, the twist angle $\phi$ of the liquid crystal molecule should desirably be set as large as possible. However, excessive increase of the angle may result in generation of a domain due to disturbing in the alignment of the liquid crystal molecules, thus lowering the contrast ratio through scattering of light. Therefore, the range of the twist angle $\phi$ for the practical application should be set as $$210° \leq \phi \leq 300° \tag{3}$$

Similar results may be obtained even when liquid crystals other than the PCH group liquid crystal are employed. Moreover, with respect to the wavelength dependency of the transmittance characteristic, it has also been confirmed through experiments by the present inventors that, when the values for $\beta$ and $\gamma$ are set within the above range, there will be no problem in the practical applications.

It is to be noted here that, in the foregoing embodiment, although the setting conditions have been described with reference to the simple matrix liquid crystal panel 5c, with respect to the other two simple matrix liquid crystal panels 5a and 5b, the value $\Delta n \cdot d$ may also be set with the range of the formula (1) according to the wavelengths of light allowed to pass therethrough.

Further, other conditions are set in a similar manner as in the liquid crystal panel 5c.

It should also be noted that the simple matrix liquid crystal panels 5a, 5b and 5c have only to controls transmittance of the blue, red and green lights respectively. Further, it is not necessarily required to have color filters incorporated within the respective liquid crystal panels 5a, 5b and 5c themselves or to have color pigments or the like contained in the liquid crystal.

Subsequently, general functioning of the projection apparatus of the present invention shown in FIG. 1 and including the three simple matrix liquid crystal panels 5a, 5b and 5c set under conditions as described so far, will be explained.

The light emitted from the light source 2 is converged by the condenser lens 1 so as to be formed into parallel rays, and is directed to the dichroic mirror 3a. Of the light rays, the blue light is reflected by the dichroic mirror 3a, while other light rays are transmitted through said dichroic mirror 3a. The blue light reflected by the mirror 3a is further reflected by the mirror 4a so as to be projected onto the first simple matrix liquid crystal panel 5a.

In this simple matrix liquid crystal panel 5a, a voltage corresponding to the blue light component of the color image to be reproduced is applied to the respective picture elements composed of the liquid crystal layer 14 through the transparent electrodes 10 and 11 shown in FIG. 2, whereby light transmittance of each picture element portion is varied. The blue light passing through the simple matrix liquid crystal panel 5a is reflected by the mirror 4b and the dichroic mirror 3b. It is then converged by the projection lens 6 so as to be projected onto the screen 7. In other words, the blue light component transmitted through the first simple matrix liquid crystal panel 5a forms the image for the blue light component of the color image on the screen 7.

On the other hand, of the light rays passing through the dichroic mirror 3a, the red light component is reflected by the next dichroic mirror 3c. It is further reflected by the mirrors 4c and 4d so as to be projected onto the second simple matrix liquid crystal panel 5b. In this liquid crystal panel 5b, in synchronization with the liquid crystal panel 5a referred to above, a voltage corresponding to the red light component of the color image to be reproduced, is impressed to the respective picture elements through its transparent electrodes 10 and 11. Thereafter light transmittance of the respective picture elements is altered.

The red light component which has passed through the simple matrix liquid crystal panel 5b is transmitted through the subsequent dichroic mirror 3b. It is then converged by the projection lens 6 so as to be projected onto the screen 7. In other words, the red light which has passed through the second simple matrix liquid crystal panel 5b forms the image for the red light component of the color image on the screen 7.

Furthermore, the green light component passing through the dichroic mirror 3c is projected onto the third simple matrix liquid crystal panel 5c. In this liquid crystal panel 5c, in synchronization with the liquid crystal panels 5a and 5b referred to earlier, a voltage corresponding to the green light component of the color image to be reproduced, is impressed to the respective picture elements through its transparent electrodes 10 and 11. Thereafter light transmittance of the respective picture elements is altered.

The green light component which has passed through the simple matrix liquid crystal panel 5c is transmitted through the next dichroic mirrors 3d and 3b, and converged by the projection lens 6 so as to be projected onto the screen 7. In other words, the green light component which has passed through the third simple matrix liquid crystal panel 5c forms the image for the green light component of the color image on the screen 7.

In the manner as described so far, on the screen 7, the images for the red, blue and green are overlapped one upon another for the additive mixture for the reproduction of the desired color image.

In the projection apparatus according to the present invention as described so far, since the light rays of the respective wavelengths of the single light source 2 can be effectively utilized, utilizing efficiency of light may be improved as compared with that of the system in which only the light of the necessary wavelength region is transmitted by absorbing filters.

Moreover, as compared with the conventional projection apparatuses employing cathode ray tubes, the apparatus of the present invention has a larger degree of freedom for selecting installing places. Thus, it becomes possible to project onto a ceiling or to project onto a wall by suspending the apparatus from the ceiling. Similarly, the size of the projected image may be altered as desired by varying the projecting distance or by replacing the projection lens.

It has been confirmed through experiments by the present inventors that in the foregoing embodiment, in the case where a white light source is employed as the light source 2, in order to effectively utilize the white light source, and also to satisfy the interchangeability thereof with respect to television signals of NTSC system, the wavelength regions of the respective light rays for the red, blue and green to be controlled by the simple matrix liquid crystal panels 5a, 5b and 5c should be set as follows for the optimum results, in which $\lambda R$ denotes the peak wavelength for the red, $\lambda G$ represents the peak wavelength for the green, and $\lambda B$ shows the peak wavelength for the blue.

Red: 600 nm $\leq \lambda R \leq$ 650 nm, with a half width being less than 50 nm.
Green: 520 nm $\leq \lambda G \leq$ 570 nm, with a half width being less than 50 nm.
Blue: 420 nm $\leq \lambda B \leq$ 470 nm, with a half width being less than 50 nm.

Meanwhile, in the foregoing embodiment, if the display contrast at each of the simple matrix liquid crystal panels 5a, 5b and 5c is set at the maximum, display characteristics such as color reproducibility, color purity, display contrast, etc. can be improved by that extent also with respect to the projection apparatus. For the above purpose, the refractive index anisotropy $\Delta nR$ (for the liquid crystal in the liquid crystal panel 5b), $\Delta n_G$ (for the liquid crystal in the crystal panel 5c), and $\Delta n_B$ (for the liquid crystal in the crystal panel 5a), and the liquid crystal layer thicknesses $d_R$ (for the liquid crystal in the liquid crystal panel 5b), $d_G$ (for the liquid crystal in the liquid crystal panel 5c), and $d_B$ (for the liquid crystal in the liquid crystal panel 5a) of the respective liquid crystals should be optimized as follows.

More specifically, as disclosed by the present inventors in another opportunity [i.e. in the 3 series F12, collection of preliminary drafts for the lectures at the 12th liquid crystal forum (1986)], since the display contrast of a liquid crystal panel depends on $\Delta n \cdot d / \lambda$ (wherein λ represents the wavelength of light to be controlled), it may be set as $$\Delta n_R \cdot d_R / \lambda_R = \Delta n_G \cdot d_G / \lambda_G \quad (4)$$
$$= \Delta n_B \cdot d_B / \lambda_B$$
$$= C$$

whereby the display contrast is made maximum by adjusting the value for C.

As a result of experiments carried out by the present inventors with respect to the embodiment as described so far, the maximum contrast has been obtained when the value C equals 1.4. From this fact, the refractive index anisotropy $\Delta n_R$, $\Delta n_G$ and $\Delta n_B$ or liquid crystal thicknesses $d_R$, $d_G$ and $d_B$ of the respective simple matrix liquid crystal panels 5a, 5b and 5c may be so adjusted as to achieve the relation C=1.4.

FIGS. 5(1), 5(2) and 5(3) show light transmittance characteristics of the respective simple matrix liquid crystal panels 5a, 5b and 5c under the conditions as described above. More specifically, FIG. 5(1) represents in dotted lines the light transmittance characteristic of the liquid crystal panel 5b for controlling the red light (as shown in solid line, its peak wavelength $\lambda_R$ is 620 nm, and the half width being less than 50 nm). FIG. 5(2) represents in dotted lines the light transmittance characteristic of the liquid crystal panel 5c for controlling the green light (as shown in solid line, its peak wavelength $\lambda_G$ is 550 nm, and the half width being less than 50 nm); and FIG. 5(3) represents in dotted lines the light transmittance characteristic of the liquid crystal panel 5a for controlling the blue light (as shown in solid lines, its peak wavelength $\lambda_B$ is 450 nm, and the half width being less than 50 nm).

It is to be noted here that in FIGS. 5(1) to 5(3), the dotted lines A1 to A3 respectively relate to the light transmittance characteristics when non-selective voltage waveforms are applied. Further, the dotted lines B1 to B3 respectively denote the light transmittance characteristics when selective voltage waveforms are impressed.

As is clear from the foregoing description, according to the projection apparatus according to the present invention, since each of the three liquid crystal panels is constituted by the simple matrix liquid crystal panel of super-twisted nematic type, such liquid crystal panels may be produced on a large scale, with a simultaneous reduction in cost. Therefore, color images superior in the display contrast may be advantageously presented.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A projection apparatus comprising:
three nematic simple matrix type liquid crystal panels for independently controlling red, green and blue color light components for a color image to be reproduced, the twist angle $\phi$ of the liquid crystal molecules of said panels being within the range of $210° \leq \phi \leq 300°$;
means for subjecting said respective color light components to an additive mixture so as to reproduce the color image;
wherein display contrast for each of said simple matrix liquid crystal panels is set to be maximum by adjusting a value C as represented by $$\Delta n_R \cdot d_R / \lambda_R = \Delta n_G \cdot d_G / \lambda_G$$
$$= \Delta n_B \cdot d_B / \lambda_B$$
$$= C$$

wherein
$\Delta n_R$ is the refractive index anisotropy for the liquid crystal in the liquid crystal panel;
$\Delta n_G$ is the refractive index anisotropy for the liquid crystal in the crystal panel;
$\Delta n_B$ is the refractive index crystal in the crystal panel;
$d_R$ is the liquid crystal layer thickness for the liquid crystal in the liquid crystal panel;
$d_G$ is the liquid crystal thickness for the liquid crystal in the liquid crystal panel; and
$d_B$ is the liquid crystal thickness for the liquid crystal in the liquid panel of the respective liquid crystals; and
wherein when a white light is employed for a light source, wavelength regions of the respective color light components for the red, green and blue controlled by the respective simple matrix liquid crystal panels are represented as:
for red: 600 nm $\leq \lambda_R \leq$ 650 nm, with a half width being less than 50 nm,
for green: 520 nm $\leq \lambda_G \leq$ 570 nm, with a half width being less than 50 nm,
for blue: 420 nm $\leq \lambda_B \leq$ 470 nm, with a half width being less than 50 nm,
wherein a peak wavelength for red is represented by $\lambda_R$, a peak wavelength for green is shown by $\lambda_G$, and a peak wavelength for blue is denoted by $\lambda_B$.

2. A projection apparatus as set forth in claim 1, wherein the value C is a constant.

3. A projection apparatus as claimed in claim 1, wherein the value C is set to be C=1.4.

4. The projection apparatus of claim 1 further including a light source;
a condenser lens in front of the light source for converting light emitted from the light source into parallel rays;
a first dichroic mirror for reflecting blue light from the light source and for permitting the blue light to pass through one of said three nematic panels for projection onto a screen for producing a blue image; and
means for receiving other light rays from said first dichroic mirror to pass distinct light rays through each of the other two nematic panels for projecting other colored images on a screen.

5. The apparatus of claim 4 wherein the light source is selected from the group consisting of an incandescent lamp, a halogen lamp or xenon lamp.

6. The apparatus of claim 4 wherein the light source is selected from the group consisting of a fluorescent lamp or a discharge tube.

7. The projection apparatus of claim 1 wherein, $\lambda_R$, $\lambda_G$, and $\lambda_B$ are 620 nm, 550 nm and 450 nm, respectively.

8. A projection apparatus comprising:

three nematic simple matrix type liquid crystal panels for independently controlling red, green and blue color light components for a color image to be reproduced, the twist angle $\phi$ of the liquid crystal molecules of said panels being within the range of $210° \leq \phi \leq 300°$;

means for subjecting said respective color light components to an additive mixture so as to reproduce the color image;

wherein when a white light is employed for a light source, wavelength regions of the respective color light components for the red, green and blue controlled by the respective simple matrix liquid crystal panels are represented as for red: 600 nm $\leq \lambda_R \leq$ 650 nm, with a half width being less than 50 nm, for green: 520 nm $\leq \lambda_G \leq$ 570 nm, with a half width being less than 50 nm, and for blue: 420 nm $\leq \lambda_B \leq$ 470 nm, with a half width being less than 50 nm, wherein a peak wavelength for red is represented by $\lambda_R$, a peak wavelength for green is shown by $\lambda_G$, and a peak wavelength for blue is denoted by $\lambda_B$.

9. The projection apparatus of claim 8 further including a white light source;

a condenser lens in front of the light emitted from the white light source into parallel rays;

a first optical system for directing light of red, green and blue light components to each of said three nematic simple matrix system panels for controlling the red, green and blue light components; and a second optical system for directing the light from each of said three nematic systems for forwarding the light to a projection lens from projecting images of red, green and blue onto a screen.

10. The apparatus of claim 9 wherein the white light source is selected from the group consisting of an incandescent lamp, a halogen lamp or a zenon lamp.

11. The apparatus of claim 9 wherein the white light source is selected from the group consisting of a fluorescent lamp or a discharge tube.

12. A projection apparatus as claimed in claim 8 wherein, $\lambda_R$, $\lambda_G$, and $\lambda_B$, are 620 nm, 550 nm, 450 nm, respectively.

* * * * *